United States Patent [19]

Jones et al.

[11] Patent Number: 5,292,545
[45] Date of Patent: Mar. 8, 1994

[54] STABLE GUM SYSTEM FOR VERY LOW CALORIE TABLE SYRUP APPLICATIONS

[75] Inventors: Lynne J. Jones, Lake Zurich; Warren A. Gordon, Rochester, both of Ill.

[73] Assignee: The Quaker Oats Company, Chicago, Ill.

[21] Appl. No.: 784,359

[22] Filed: Oct. 29, 1991

Related U.S. Application Data

[63] Continuation-in-part of Ser. No. 559,121, Jul. 26, 1990, abandoned.

[51] Int. Cl.5 .............................................. A23L 2/00
[52] U.S. Cl. .................................... 426/575; 426/658; 426/804
[58] Field of Search ................... 106/197.2, 208, 170; 426/658, 804, 575; 514/57

[56] References Cited

U.S. PATENT DOCUMENTS

| | | | |
|---|---|---|---|
| 4,844,922 | 7/1989 | Uemura | 426/576 |
| 4,986,994 | 1/1991 | Baccus | 426/590 |
| 4,988,530 | 1/1991 | Hoersten | 426/590 |
| 5,011,701 | 4/1991 | Baer | 426/573 |
| 5,069,924 | 12/1991 | Baccus | 426/590 |

*Primary Examiner*—Carolyn Paden
*Attorney, Agent, or Firm*—Mart C. Matthews; Lars S. Johnson

[57] ABSTRACT

Provided is a gum system including carboxymethylcellulose and xanthan gums which provides a stable desirous vehicle for very low calorie table syrup applications. The gum systems of the present invention have a desirable mouthfeel, stability, viscosity, and pourability. Preparations in accordance with the present invention result in a gum system useful in the manufacturing of palatable very low calorie synthetic table syrups which contain little or no sugar solids.

45 Claims, No Drawings

STABLE GUM SYSTEM FOR VERY LOW CALORIE TABLE SYRUP APPLICATIONS

This application is a continuation-in-part of U.S. Ser. No. 559121, filed Jul. 26, 1990, which is now abandoned.

BACKGROUND OF THE INVENTION

1. Field of the Invention

This invention relates to a gum system for table syrup applications. More particularly, the invention relates to a gum system for very low calorie table syrup applications.

2. Description of Related Art

In recent years there have been developed a number of synthetic table syrup products. For purposes of the present invention, the term "synthetic table syrup" is meant to describe a table syrup product manufactured to be comparable in quality to the naturally occurring syrups, e.g., maple syrup. Among the qualities to which synthetic table syrups are intended to be comparable are taste, mouthfeel, pourability, viscosity, and stability.

Synthetic table syrups include a gum system and a large percentage of sugar solids. The gum system is included so that the synthetic syrup mimics the natural syrups in appearance, viscosity, pourability, and mouthfeel. Typically, the gum system includes a suspending, dispersing, or colloidal agent in water. Synthetic and naturally occurring gums are often used in the manufacture of gum systems. Edible preservatives and antimicrobials are often added to the gum system to ensure stability.

A significant volume of a synthetic table syrup is suspended sugar solids. These sugar solids account to a considerable extent for qualities such as taste, mouthfeel, viscosity, pourability and stability. However, the high sugar solids content of these syrups makes them high in calories, and accordingly, they do not satisfy consumer demand for lower calorie food stuffs.

Attempts to produce a reduced calorie synthetic table syrup have been reported in the patent literature. U.S. Pat. No. 4,786,521 Bennett et al. describes a synthetic table syrup including by weight from about 15 to about 45% sugar solids, and up to 50% maltodextrin. The syrup further includes a gum system consisting of carboxymethylcellulose gum (CMC) and propylene glycol alginate (PGA). Bennett et al. attributes the characteristics of the syrup to the critical relationship between the CMC and the PGA. Specifically, the weight ratio of the CMC to the PGA must be about 2:1.

U.S. Pat. No. 4,394,399 Keyser et al. describes a reduced calorie synthetic table syrup including by weight about 40% sugar solids, and a gum system consisting of from about 0.5 to about 1.0% CMC. Keyser et al., teaches that relatively small increases in the amount of CMC, apparently above 1.0%, dramatically increase viscosity and yield a product having a stringy, slimy, undesirable mouthfeel. Keyser et al. attributes the desirable consistency, mouthfeel, and pourability of their syrup to the interaction between the CMC and the sugar solids.

Although the above literature describes synthetic table syrups having a reduced calorie content, these reduced calorie syrups still have a calorie content of from about 24 to about 50 calories per ounce. Products having calorie concentrations as great as this are not acceptable to the vast majority of calorie conscious consumers. The relatively high calorie content of these "reduced" calorie syrups is attributable to the high concentration of sugar solids contained in them.

Although removing the sugar solids in favor of water and a non-nutritive high intensity artificial sweetener, such as, saccharin or aspartame, may appear to be a quick and convenient solution to this problem, it should be noted that the viscosity, stability, pourability, and mouthfeel of these products depends to a great extent on the sugar solids. For example, the above cited patents attribute the desirable characteristics of lower calorie synthetic syrups to the critical interactions between the sugar solids and the gum system. A further complication is realized when it is appreciated that a significant volume of these syrups are comprised of sugar solids, often, as much as 70%. Replacing this volume with water and a high intensity artificial non nutritive sweetener would result in an undesirable, watery, dilute product. Furthermore, replacing this volume with water and a gum system would appear, after reviewing the relevant patent literature, to be futile since the patent literature teaches that gums, e.g., CMC, used in amounts high enough to supply the necessary viscosity for a very low calorie syrup would impair important mouthfeel and pourability characteristics.

Presently, sugar solids, and their corresponding interaction with the gum system, are required to produce a product having an acceptable viscosity, mouthfeel, pourability, and stability. However, these products are not acceptable to consumers because of their relatively high calorie content. There is presently a great demand for a very low calorie table syrup; but, as discussed above, no gum system currently available can impart a desirable viscosity, mouthfeel, stability, and pourability to a table syrup application in the absence of sugar solids.

It is therefore a principal object of the present invention to provide a gum system for use in preparing very low calorie synthetic table syrups having a desirable viscosity, mouthfeel, pourability, and stability. It is an object of the present invention to provide a pourable food product for use in table syrup applications which contain little or no sugar solids.

It is a further object of the present invention to provide a pourable food product for use in combination with a non-nutritive high intensity sweetener in table syrup applications which contain less than about 25 calories per fluid ounce.

SUMMARY OF THE INVENTION

In accordance with the present invention a stable gum system has been discussed for very low calorie table syrup applications. By very low calorie table syrup it is meant a syrup comprising from 0 to about 25 calories. The gum system includes by weight of the total syrup composition from about 1.00% to about 1.75% carboxymethylcellulose; and from about 0.10% to about 0.27% xanthan gum. It has been determined that the weight ratio of the carboxymethylcellulose to the xanthan gum is preferably maintained in a range of from about 5:1 to about 12:1. The gum systems of the present invention provide a pourable food product having a desirable viscosity, mouthfeel, pourability, and stability. Further, it has been determined that these desirous characteristics are imparted to very low calorie synthetic table syrups containing little or no sugar solids and a high intensity artificial non-nutritive sweetener, such as, saccharin.

According to a preferred embodiment of the invention, the gum system includes by weight of the total syrup composition from about 1.00% to about 1.40% carboxymethylcellulose or derivative thereof, and from about 0.14% to about 0.22% xanthan gum. The weight ratio of the carboxymethylcellulose to the xanthan gum being maintained in a range of from about 5:1 to about 8:1. Also in preferred embodiments, the gum system may include edible preservatives, anti-mycotic agents, deionized water, and chelating agents.

A further and still important aspect of the present invention is a process for preparing a gum system for very low calorie table syrup applications. The process includes dissolving the CMC and xanthan gum components in the proportions set forth above in water. Since the order and method by which these and other ingredients are added can be very important in producing a desirous product, the process of the present invention also includes the steps by which the ingredients are added. For example, when a chelating agent is included in the gum system, it is preferably added to the water before any other ingredients. This allows the chelating agent to bind any metal ions in the water before they can react with or degrade any of the other ingredients. Thereafter, the CMC and xanthan gums are slowly added to the mixture with agitation. The gums are added at this point in the process so that they can be sufficiently hydrated without competing with other ingredients for the available water. Once the gums are sufficiently solubilized, any other preferred ingredients, such as anti-mycotic agents, edible preservatives, and salt, are added. The process may optionally contain a step of pasteurizing the gum mixture.

DESCRIPTION OF THE PREFERRED EMBODIMENTS

It has been quite unexpectedly determined that particular gum systems including carboxymethylcellulose and xanthan gum provide a desirous stable vehicle for very low calorie table syrup applications. It has been determined that the gum systems of the present invention have a desirable mouthfeel, stability, viscosity, and pourability. Preparations in accordance with the present invention result in a gum system useful in the manufacturing of palatable very low calorie synthetic table syrups which contain little or no sugar solids.

"Carboxymethylcellulose" herein means a medium or low viscosity carboxymethyl cellulose gum including derivatives thereof, such as soluble metal salts. The most preferred soluble metal salt being the sodium salt, the carboxymethylcellulose gum also preferably has a relatively high degree of carboxymethyl substitution. "Medium or low viscosity carboxymethylcellulose gum" herein means one which exhibits a viscosity of from about 25 to 7000 centipoise ("cps") when added to water at a 2% concentration level and viscosity is determined at 25 degrees C. on a Brookfield LVT viscometer. A "relatively high degree of carboxymethyl substitution" herein means that there are from about 0.70 to about 0.95 carboxymethyl groups per anhydroglucose unit.

Medium or low viscosity carboxymethylcellulose gums, and the soluble metal salts thereof, are well known and are commercially available from Aqualan Company under the designation 9M31F, 9M8F, and 7LF. A preferred gum is sodium carboxymethylcellulose gum, available under the designation 9M31F from the Aqualan Company. 9M31F has a degree of carboxymethyl substitution of from about 0.85 to about 0.95, and an average viscosity of from about 1900 to about 2450 cps when at a 2% concentration level at 25 degrees C.

The carboxymethylcellulose gum ingredient functions, in association with the xanthan gum, to impart a desired viscosity, mouthfeel, stability, and pourability to the gum system. Preferably, the viscosity of the final syrup product containing the gum system is from about 250 to about 1000 cps, and more preferably, from about 400 to about 700 cps as measured on a Brookfield LVT viscometer at 25 degrees C. Generally, the carboxymethylcellulose gum ingredient is included in an amount of from about 1.00% to about 1.75%, preferably from about 1.00% to about 1.60% by weight of the syrup composition. More preferably, the carboxymethylcellulose gum is included in an amount or from about 1.00% to about 1.40% by weight of the total syrup composition.

The xanthan gum employed is a polysaccharide produced by the bacterium *Xanthomonas campestris*. Xanthan gum consists of mannose, glucose and glucuronic acid as a mixed potassium, sodium and calcium salt. It is preferable to utilize a clarified variety of low cellulase xanthan gum which has been purified by filtration to remove particulate matter. Clarified xanthan gum provides transparent formulation; non-clarified gum results in a cloudy formulation. The xanthan gum preferably exhibits a viscosity of from about 1200 to about 1600 cps when added to 1 wt. percent KCl water solution at a 1% xanthan gum concentration level and a viscosity determined at 25 degrees C. on a Brookfield LVT viscometer. Xanthan gums are well known, and are commercially available. Product No. K6B166, from Kelco Gums, San Diego, Ca., is a preferred xanthan gum for purposes of the present invention. The xanthan gum ingredient functions, in association with the carboxymethylcellulose gum ingredient, to impart the desired characteristics to the product as discussed above. Generally, the xanthan gum ingredient is included in an amount of from about 0.10% to about 0.27%, preferably from about 0.14% to about 0.27% by weight of the syrup composition. More preferably, however, the xanthan gum is included in an amount of from about 0.14% to about 0.22% by weight of the syrup composition.

The gum systems of the present invention are aqueous. It is been determined that water quality plays an important role in the viscosity retention of the gum system during storage. Preferably, the water used in preparation of the gum systems of the instant invention is deionized or distilled water. It is widely known that solubilized metals will reduce, over time, the viscosity of gum systems which include carboxymethylcellulose gums. Accordingly, it is most preferred that a source of water including little or no metal ions is used in the preparation of the gum systems of the present invention. According to one embodiment of the invention, deionized water passed through a cationic-anionic exchange resin filter is used in preparing the inventive gum system. The gum systems of the present invention preferably include at least about 75% water. More preferably, however, the gum systems include more than 93%, and most preferably, more than 95% water.

Surprisingly, it has been found that a gum system including no sugar solids, at least about 75% water, and more than about 1.0% CMC has a desirable stability, viscosity, mouthfeel and pouring characteristics. According to the patent literature cited above, gum systems which have a significant sugar content and which include greater than about 1% CMC have an unacceptable, undesirable mouthfeel. It was reported in the patent literature that a relatively small increase in the concentration of CMC, e.g., a 10% increase in the level of CMC, produced detrimental effects. These effects were characterized by a product having a stringy or slimy mouthfeel. While removal of a significant amount of the sugar obviates the aforesaid problems, the resulting product's viscosity is not sufficient for consumer acceptance. Thus, there are significant problems with formulating a consumer-acceptable low calorie syrup.

Not only are low concentrations of CMC identified as critical in the literature, i.e., less than 1.00% or below, the relative amounts of the CMC, other gums, sugar solids, and water are all identified as critical for producing an organoleptically acceptable product. For example, the desirable mouthfeel, and consistency of prior synthetic table syrup products has been consistently identified as resulting from the interactions of the gum system and the sugar solids. It was further reported that the use of excessive water, apparently greater than about 65%, produces a dilute product having reduced viscosity, color intensity, and flavor intensity. In light of the relevant patent literature, it was surprising and unexpected to discover that a gum system including little or no sugar solids, at least 75% water, greater than 0.10% xanthan gum, and greater than about 1.00% CMC provided a stable gum system having an acceptable mouthfeel, viscosity, and pourability.

It has been determined that if the weight ratio between the CMC and the xanthan gum is maintained in a range of from about 5:1 to about 12:1, preferably from about 5:1 to about 8:1, greater concentrations of CMC may be used than ever before thought possible. Without intending to limit the invention, it is believed that the interaction between the CMC and the xanthan gum allow for a greater concentration of CMC to be used in the inventive formulations. Since a greater concentration of CMC is used in the inventive gum system, a pourable food product can be made which has a desirable viscosity, mouthfeel, and pourability without including any sugar solids. Table syrup applications using the gum systems of the present invention are described below which include no or a minimal amount, i.e., less than 10%, sugar solids. Referring to the table syrup applications which include a minimal amount of sugar solids, sugar solids are included in these applications only to overcome the possibly undesirable taste profile of the artificial sweetener, such as saccharin. It should be noted, however, that these low concentrations of sugar solids are not included to affect pourability, mouthfeel, stability, and viscosity, and that the gum systems of the present invention are preferably compounded as table syrup applications including no sugar solids and an artificial sweetener having a desirous taste profile. It should also be noted that zero calorie syrups prepared according to the present invention will have an overall gum concentration higher than caloric syrups of the present invention, although the ratio of xanthan gum to CMC will remain the same.

It has been further discovered that an unexpected synergistic effect occurs at the overall gum concentration range and xanthan:CMC gum ratios of the present invention. The viscosity of a table syrup product containing such a gum system, at the specified concentration and ratio range, is unexpectedly greater than theoretically predicted.

Salt (sodium chloride) may be used with the gum system of the present invention to accentuate flavors. An amount of from about 0.10% to about 1.00% by syrup composition weight can be used. However, it should be noted that in applications where the limitation of sodium is necessary, i.e., low sodium foodstuffs, potassium chloride can also be included to accentuate flavors in an amount of from about 0.10% to about 1.00% total syrup composition weight.

Flavoring agents, such as, maple flavor, artificial butter flavor, butterscotch, nut, fruit flavors, sweetness enhancers and caramel, can be used with the gum system of the present invention to impart a desired flavor. The flavoring agents are usually included in small amounts, such as, from about 0.01 to about 0.50% by weight of the composition.

Acidulants and buffers may be used with the gum system of the present invention to adjust product pH. For example, sodium citrate can be useful in adjusting pH. These ingredients can be included in amounts of from about 0.01% to about 1.00% by weight of the composition. Preferably, if necessary, sufficient concentrations of Acidulants and/or buffers are included to maintain the pH of the formulation in a range of from about 4 to about 5.

If desired, conventional edible coloring agents may also be utilized with the gum system of the present invention to achieve a particular color. The food color can be generally added in small amounts to achieve a desired colored appearance.

In preferred embodiments of the gum system of the present invention, small amounts of anti-mycotic agents or combinations of edible preservatives such as sorbic acid, potassium sorbate, and sodium benzoate are included to assure microbial stability. Generally, the edible preservatives can be included in an amount of from about 0.01% to about 0.50%, preferably from about 0.01% to about 0.10% by weight. More preferably, the edible preservatives include sorbic acid in an amount of from about 0.01% to about 0.10%, and sodium benzoate in an amount from about 0.01% to about 0.10%.

Accelerated storage studies have shown that the gas permeability of the container and metal ion content of the ingredients are important to viscosity retention of the gum system over time. The gum system, of the present invention, since it includes CMC, is susceptible to breakdown by the presence of oxygen and metal ions, especially divalent cations, such as iron. Deionized water can be used in the gum system of the present invention to improve viscosity retention overtime. "Deionized water," herein means water having a reduced ion content, preferably having a specific resistance of at least 200 Kilo ohms/cm at 20 degrees C., and more preferably at least about 500 Kilo-ohms/cm. The use of a chelating agent such as sodium hexametaphosphate (SHMP) or ethylenediamine tetraacetic acid (EDTA) can also improve viscosity retention. Storage studies of the inventive gum systems manufactured with the combination of reduced ion water and SHMP have yielded data demonstrating no substantial viscosity loss expected for at home storage of table syrups for at least 6 months. When utilized in the present invention, the chelating agent is typically included in an amount of from about 0.01% to about 0.10% by weight of the composition. In a preferred embodiment of the present, SHMP is included as the chelating agent in the inventive gum system. SHMP is preferably included in an amount of from about 0.01% to about 0.10% by weight of the composition. More preferably, however, the SHMP ingredient is included in an amount of from about 0.025% to about 0.075% by weight.

In accordance with another aspect of the present invention, a method is provided for preparing the gum systems of the present invention. The process includes dissolving the CMC and xanthan gum components in water, in the ratio of CMC to xanthan gum in the range from about 5:1 to about 12:1 and in amounts effective to provide a viscosity for the gum system in the range of about 250 to about 1000 cps as measured on a Brookfield LVT viscometer at about 25 degrees C.; generally about 1.00 to 1.75 weight % CMC and 0.10 to 0.27% weight % xanthan gum. Since the order and method by which these and other ingredient are added can be very important in producing a desirous product, the process of the present invention also includes the steps by which the ingredients are added.

According to one embodiment, the process begins by adding a chelating agent such as SHMP to heated deionized water. If a chelating agent is being included, it is desirable that it is added to the water first so that it has an opportunity to chelate the free metal ions before they damage other ingredients. Preferably, the temperature of the water is held constant at from about 54–60 degrees C. The gums, CMC and xanthan gum, are then added by means of a high shear mixer or equivalent unit. The gums preferably are added at this point. Salt, edible preservatives, flavorants, coloring agents, artificial sweeteners, and anti-mycotic agents can be then be added in almost any order. If a minimal amount of sugar solids (less than 10%) are desired, the sugar solids can be added together with the artificial sweeteners. The entire mixture can thereafter be pasteurized, preferably, at about 88 degrees C. for about one minute. The mixture should then be rapidly cooled to protect the ingredients from heat degradation. The mixture can then be packaged. Preferably, the gum system is packaged in a container which retards or prevents oxygen diffusion into the contained product. Containers which can be used for the syrups of the present invention may be constructed from dense plastics, glass, or metal, with glass being preferred.

The following examples are presented to describe preferred embodiments and utilities of the present invention and are not meant to limit the present invention unless otherwise stated in the claims appended hereto.

EXAMPLES

EXAMPLE 1

General Procedure for Producing a Zero Calorie Table Syrup Having a CMC/Xanthan Gum System A gum system according to this invention can be made for a 3,000 gram batch of table syrup using ingredients from the following table in the weight percentages and amounts indicated:

| Ingredient | Percentage | Amount (g) |
|---|---|---|
| Water | 97.16 | 2914.88 |
| Sodium Hexametaphosphate | 0.05 | 1.50 |
| Carboxymethylcellulose | 1.24 | 37.06 |
| Xanthan Gum | 0.21 | 6.36 |
| Sorbic Acid | 0.10 | 3.00 |
| Salt | 0.44 | 13.26 |
| Sodium Benzoate | 0.09 | 2.70 |
| Flavors/Colors/Artificial | 0.61 | 18.24 |
| Non-Nutritive Sweetener | 0.10 | 3.00 |

-continued

| Ingredient | Percentage | Amount (g) |
|---|---|---|
| Total | 100.00 | 3000.00 |

Weigh out the 2914.88 grams of water and place it into the top insert of a double boiler. This water should be deionized water. For example, it can be deionized water from a point-of-use system such as the Interlake Continental Water Systems Model 350F Activated Carbon Unit and Model 350MB Mixed Bed Deionizer (anion/cation) from Interlake Continental Water Systems Co. Broadview, IL. Add hot tap water to the bottom of the double boiler and heat the deionized water to about 57–60 degrees C. This temperature should be maintained while adding ingredients. Use a nonaerating stirrer to incorporate ingredients into the heated water. For example, a Glas-Col Model S-25 stirrer (Glas-Col Apparatus Co., Terra Haute, IN.) can be used together with appropriate equipment to control and monitor stirrer speed. The stirrer should be placed on a mixer stand near the double boiler so that the mixer blade is within one-half inch of the bottom of the double boiler insert. The top of the double boiler can be covered with aluminum foil to reduce moisture loss. Adjust the mixer speed to 2300–3500 rpm and add the 1.50 grams sodium hexametaphosphate (SHMP). Allow the water and SHMP to mix for about three minutes.

The 37.06 grams CMC and 6.36 grams xanthan gum should be weighed out and manually pre-blended before adding them to the water. The CMC and xanthan gum can be commercially available products, such as CMC 9M31F from Aqualan Company and Product No. K6B166 from Kelco Gums, respectively. Increase the stirrer speed to 4000–4200 rpm and add the CMC/xanthan gum blend slowly (it should take about three minutes to add all of the blend). After the CMC and xanthan gum have been added, use a spatula to scrape any unblended ingredients off of the double boiler wall and into the mixture. Cover the double boiler with foil and mix for about three minutes. Then add the 13.26 grams salt, 3.00 grams sorbic acid and 2.70 grams sodium benzoate to the mixture. If desired, these ingredients can also be weighed out and manually pre-blended before adding them to the mixture. Mix for an additional three minutes at 4000–4500 rpm. Then add the flavors, colors and non-nutritive artificial sweetener. Mix for an additional three minutes at 4000–4500 rpm.

Heat the mixture with continued agitation to 88 degrees C. and then hold at that temperature for about one minute without agitation. Then quickly remove the mixture from the heat, pour it into conventional syrup bottles (polypropylene syrup bottles are acceptable), and cap the bottles tightly. Chill the bottles to about 38 degrees C. in a chilled water bath maintained at 4–18 degrees C. The resulting syrup has a viscosity of 545 cps.

EXAMPLES 2–5

Analytical Characteristics of Zero Calorie Table Syrups Made with the Gum System Several zero calorie table syrup batches were made substantially as described in Example 1 although there were slight differences in CMC/xanthan gum concentrations in some batches. All of these Examples used a gum system according to the present invention. Table 1 summarizes the gum composition and viscosity for each Example.

TABLE 1

| Example | Concentration of Gums | Viscosity |
|---|---|---|
| EXAMPLE 2 | 1.08% CMC/0.27% xanthan gum | 435 cps |
| EXAMPLE 3 | 1.28% CMC/0.22% xanthan gum | 518 cps |
| EXAMPLE 4 | 1.29% CMC/0.22% xanthan gum | 615 cps |
| EXAMPLE 5 | 1.30% CMC/0.22% xanthan gum | 478 cps |

EXAMPLE 6

A Low Calorie Table Syrup Made with the Gum System which also Contains a Carbohydrate Sweetener A gum system according to this invention can be made and used for a 3,000 gram batch of table syrup which also includes a minor amount of a carbohydrate sweetener by using ingredients from the following table in the weight percentages and amounts indicated:

| Ingredient | Percentage | Amount (g) |
|---|---|---|
| Water | 91.13 | 2733.77 |
| Sodium Hexametaphosphate | 0.05 | 1.50 |
| Carboxymethylcellulose | 1.22 | 36.48 |
| Xanthan Gum | 0.21 | 6.19 |
| Sorbic Acid | 0.10 | 3.00 |
| Salt | 0.42 | 12.66 |
| Sodium Benzoate | 0.09 | 2.70 |
| Flavors/Colors/Artificial | 0.74 | 22.20 |
| Carbohydrate Sweetener | 6.00 | 180.00 |
| Non-nutritive Sweetener | 0.05 | 1.50 |
| Total | 100.00 | 3000.00 |

Prepare the gum system and table syrup substantially as described in Example 1 but add 180.00 grams carbohydrate sweetener and 1.5 grams non-nutritive sweetener to the mixture following the addition and mixing of the gums and mix for an additional three minutes. The resulting table syrup has a viscosity of 533 cps.

EXAMPLES 7-10

Analytical Characteristics of Low Calorie Table Syrups Made with the Gum System and a Carbohydrate Sweetener.

Several caloric table syrups having a low calorie content were made substantially as described in Example 6. All of these Examples used a gum system according to the present invention. Table 2 summarizes the gum composition and analytical results for each example.

TABLE 2

| Example | Concentration of Gums | Viscosity |
|---|---|---|
| EXAMPLE 7 | 1.20% CMC/0.21% xanthan gum | 582 cps |
| EXAMPLE 8 | 1.11% CMC/0.19% xanthan gum | 432 cps |
| EXAMPLE 9 | 1.28% CMC/0.22% xanthan gum | 575 cps |
| EXAMPLE 10 | 1.32% CMC/0.22% xanthan gum | 600 cps |

EXAMPLE 11

Effect of Long Term Storage on Viscosity Retention

A low calorie table syrup comprising 6.8 wt. % fructose sweetener, 1.19 wt. % CMC and 0.21 wt. % xanthan gum, and having an initial viscosity at 468 cps, was prepared. This syrup was stored in a polypropylene container at ambient temperature (typically ranging from about 21-24 degrees C) for a period of 189 days. On the 189th day, the viscosity was measured at 400 cps, which represents an average viscosity loss of 0.34 cps per day. A viscosity loss in the range of from about 0.50 to about 0.70 is considered acceptable.

What is claimed is:

1. A gum system for use in very low calorie table syrup applications, said gum system comprising by weight of said total syrup composition:
   a. from about 1.00% to about 1.75% carboxymethylcellulose; and
   b. from about 0.10% to about 0.27% xanthan gum; wherein the weight ratio of the carboxymethylcellulose to xanthan gum ranges from about 5:1 to about 12:1.

2. The gum system of claim 1 wherein the carboxymethylcellulose is included in an amount of from about 1.00% to about 1.60% by weight of the total syrup composition.

3. The gum system of claim 1 wherein the xanthan gum is included in an amount of from about 0.14% to about 0.27% by weight of the total syrup composition.

4. The composition of claim 1 further comprising at least about 75% by weight of the total syrup composition of deionized water.

5. The composition of claim 1 further comprising from about 0.01% to about 0.10% by weight of the total syrup composition of a chelating agent.

6. The composition of claim 1 further comprising an edible preservative in an amount of from about 0.01% to about 0.10% by weight of the total syrup composition.

7. The composition of claim 5 wherein the chelating agent is sodium hexametaphosphate.

8. A very low calorie table syrup comprising, by weight of the total syrup composition:
   a. from about 1.00% to about 1.40% carboxymethylcellulose;
   b. from about 0.14% to about 0.22% xanthan gum, wherein the weight ratio of the carboxymethylcellulose to xanthan gum ranges from about 5:1 to about 12:1;
   c. at least about 75% deionized water;
   d. from about 0.01% to about 0.10% of a chelating agent; and
   e. from about 0.01% to about 0.10% of an edible preservative;
wherein the total syrup composition comprises 100% by weight.

9. The composition of claim 8 wherein said composition has a pH of from about 4 to about 5.

10. The composition of claim 8 wherein the ratio of the CMC to xanthan gum is further defined as from about 5:1 to about 8:1.

11. The composition of claim 8 wherein the viscosity is from about 400 to about 700 cps.

12. A very low calorie table syrup comprising by weight of the total syrup composition:
   a. greater than 75% deionized water;
   b. carboxymethylcellulose; and
   c. xanthan gum;
wherein the weight ratio of the carboxymethylcellulose to xanthan gum ranges from about 5:1 to about 8:1 and wherein the carboxymethylcellulose and xanthan gums are provided in amounts effective to produce a syrup composition having a viscosity in the range of from about 250 to about 1000 Cps as measured on a Brookfield LVT viscometer at about 25° C., and wherein the total syrup composition comprises 100% by weight.

13. A composition according to claim 12 wherein the composition viscosity is in the range of about 400 to 700 cps.

14. A composition according to claim 12 further comprising from about 0.01% to about 0.10% by weight of a chelating agent.

15. A composition according to claim 14 wherein the chelating agent is sodium hexametaphosphate.

16. A very low calorie table syrup comprising by weight of the total syrup composition:
   a. from about 1.00% to about 1.40% carboxymethylcellulose:
   b. from about 0.14% to about 0.22% xanthan gum, wherein the weight ratio of the carboxymethylcellulose to xanthan gum ranges from about 5:1 to about 8:1;
   c. at least about 75% deionized water;
   d. from about 0.01% to about 0.10% sodium hexametaphosphate; and
   e. from about 0.01% to about 0.10% of an edible preservative;
wherein the total syrup composition comprises 100% by weight.

17. A process for preparing a gum system for use in very low calorie table syrup applications comprising the step of: mixing effective amounts of carboxymethylcellulose and xanthan gum with water in a weight ratio of carboxymethylcellulose to xanthan gum of from about 5:1 to about 8:1; wherein the carboxymethylcellulose and xanthan gums are provided in amounts effective to produce a very low calorie syrup composition having a viscosity in the range of from about 250 to about 1000 Cps as measured on a Brookfield LVT viscometer at about 25° C.

18. The process of claim 17 wherein the water is deionized water.

19. The process of claim 17 wherein the water is mixed with a chelating agent prior to mixing with carboxymethylcellulose and xanthan gum.

20. The process of claim 19 wherein the chelating agent is sodium hexametaphosphate.

21. The process of claim 17 wherein the process also comprises the step of pasteurizing the mixture.

22. The process of claim 17 wherein the mixture has a viscosity of from about 400 to about 700 cps.

23. A process for preparing gum systems for use in very low calorie table syrup applications comprising the steps of:
   a. mixing deionized water with a chelating agent to form a premix; and
   b. mixing carboxymethylcellulose and xanthan gum with the premix in a weight ratio of carboxymethylcellulose to xanthan gum of from about 5:1 to about 8:1;
wherein the carboxymethylcellulose and xanthan gums are provided in amounts effective to produce a very low calorie syrup composition having a viscosity in the range of from about 250 to about 1000 Cps as measured on a Brookfield LVT viscometer at about 25° C.

24. The process of claim 23 where in the chelating agent is sodium hexametaphosphate.

25. The process of claim 23 wherein the process also comprises the step of pasteurizing the mixture.

26. A process for preparing a gum system for use in very low calorie table syrup applications comprising the step of: mixing from about 1.00 to about 1.75 weight percent carboxymethylcellulose and from about 0.10 to about 0.27 weight percent xanthan gum, based on the weight of said very low calorie table syrup, with water, wherein the weight ratio of carboxymethylcellulose to xanthan gum is in the range of from about 5:1 to about 12:1.

27. The process of claim 26 wherein the water is deionized water.

28. The process of claim 26 wherein the water is mixed with a chelating agent prior to mixing with carboxymethylcellulose and xanthan gum.

29. The process of claim 28 wherein the chelating agent is sodium hexametaphosphate.

30. The process of claim 29 wherein the amount of sodium hexametaphosphate is in the range of from about 0.01 to about 0.10 weight percent, based on the weight of said very low calorie table syrup.

31. The process of claim 26 wherein the process also comprises the step of pasteurizing the mixture.

32. A process for preparing a gum system for use in very low calorie table syrup applications comprising the steps of:
   a. mixing deionized water with a chelating agent to form a premix; and
   b. mixing from about 1.00 to about 1.75 weight percent carboxymethylcellulose and from about 0.10 to about 0.27 weight percent xanthan gum, based on the weight of said very low calorie table syrup, with the premix in a weight ratio of carboxymethylcellulose to xanthan gum of from about 5:1 to about 12:1.

33. The process of claim 32 wherein the chelating agent is sodium hexametaphosphate.

34. A gum system for use in very low calorie table syrup applications comprising, by weight of said total syrup composition:
   a. from about 1.0 to about 1.75% carboxymethylcellulose; and
   b. from about 0.10 to about 0.175% xanthan gum.

35. A gum system according to claim 34 wherein the weight ratio of the carboxymethylcellulose to xanthan gum ranges from about 9:1 to about 12:1.

36. A gum system for use in very low calorie table syrup applications consisting of, by weight of said total syrup composition:
   a. from about 1.0 to about 1.75% carboxymethylcellulose; and
   b. from about 0.10 to about 0.175% xanthan gum.

37. A gum system according to claim 36 wherein the weight ratio of the carboxymethylcellulose to xanthan gum ranges from about 9:1 to about 12:1.

38. A very low calorie table syrup comprising, by weight of the total syrup composition:
   a. a gum system comprising, by weight of the total syrup composition, from about 1.20 to about 1.60% carboxymethylcellulose and from about 0.120 to about 0.160% xanthan gum;
   b. at least about 90% deionized water;
   c. from about 0.01 to about 0.1% of a chelating agent; and
   d. from about 0.01 to about 0.1% of an edible preservative;
wherein the total syrup composition comprises 100% by weight.

39. A very low calorie syrup composition according to claim 38 wherein the weight ratio of the carboxymethylcellulose to xanthan gum ranges from about 9:1 to about 12:1.

40. A very low calorie table syrup comprising, by weight of the total syrup composition:

a. a gum system consisting of, by weight of the total syrup composition, from about 1.20 to about 1.60% carboxymethylcellulose and from about 0.120 to about 0.160% xanthan gum;
b. at least about 90% deionized water;
c. from about 0.01 to about 0.1% of a chelating agent; and
d. from about 0.01 to about 0.1% of an edible preservative;

wherein the total syrup composition comprises 100% by weight.

41. A very low calorie syrup composition according to claim 40 wherein the weight ratio of the carboxymethylcellulose to xanthan gum ranges from about 9:1 to about 12:1.

42. A gum system for use in very low calorie table syrup applications comprising, by weight of said total syrup composition:
a. greater than 90% deionized water;
b. carboxymethylcellulose; and
c. xanthan gum;

wherein the carboxymethylcellulose and xanthan gum are provided in amounts effective to produce a viscosity for the gum system in the range of from about 250 to about 1000 Cps as measured on a Brookfield RVT viscometer at about 20° C.

43. A gum system according to claim 42 wherein the weight ratio of the carboxymethylcellulose to xanthan gum ranges from about 9:1 to about 12:1.

44. A gum system for use in very low calorie table syrup applications consisting of, by weight of said total syrup composition:
a. greater than 90% deionized water;
b. carboxymethylcellulose; and
c. xanthan gum;

wherein the carboxymethylcellulose and xanthan gum are provided in amounts effective to produce a viscosity for the gum system in the range of from about 250 to about 1000 Cps as measured on a Brookfield RVT viscometer at about 20° C.

45. A gum system according to claim 44 wherein the weight ratio of the carboxymethylcellulose to xanthan gum ranges from about 9:1 to about 12:1.

* * * * *